UNITED STATES PATENT OFFICE.

JUDSON SCHULTZ, OF ELLENVILLE, NEW YORK.

IMPROVEMENT IN TANNING.

Specification forming part of Letters Patent No. 53,668, dated April 3, 1866; Reissue No. 2,285, dated June 12, 1866.

*To all whom it may concern:*

Be it known that I, JUDSON SCHULTZ, of Ellenville, in the county of Ulster and State of New York, have invented a new and useful Improvement in Tanning Hides; and I do hereby declare that the following is a full, clear, and exact description thereof, which will enable others skilled in the art to make and use the same.

The object of this invention is to increase the fullness of the skins, render leather more tough and durable, and also improve the color thereof.

In the ordinary process of tanning it is customary to "lay up," or, more correctly, "lay away," the sides or skins by introducing between the skins a layer of tan-bark. Straw is sometimes used instead of tan-bark. As fast as the skins are thus laid away they are immersed in the tanning-liquid, and thereafter go through the usual process of tanning.

My improvement consists in using for the lay-away a quantity of wood divided into small pieces, such as saw-dust, made from hemlock wood, oak wood, or other wood which is rich in pyroligneous acid.

I introduce the wood between the skins in the same manner that tan-bark is introduced, by covering the upper surface of one skin with the wood, then laying on another skin and covering its upper surface, and so on.

The effect of the wood, owing, as I suppose, to the presence of pyroligneous acid or other chemical substances, is to render the skins more full, to toughen the character of the leather, and to improve its color.

I do not limit or confine myself to any particular mode of carrying my improvement into practice; but,

Having thus described my invention, I claim as new and desire to secure by Letters Patent—

The treating of hides or skins substantially as herein described.

JUDSON SCHULTZ.

Witnesses:

HENRY KIRKHAM,

FRANK CLARK.